US011156255B2

United States Patent
Sugano et al.

(10) Patent No.: US 11,156,255 B2
(45) Date of Patent: Oct. 26, 2021

(54) POWER UNIT

(71) Applicant: HONDA MOTOR CO., LTD., Tokyo (JP)

(72) Inventors: Takeshi Sugano, Wako (JP); Kensuke Mori, Wako (JP); Yoshitaka Nukada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 190 days.

(21) Appl. No.: 16/507,111

(22) Filed: Jul. 10, 2019

(65) Prior Publication Data
US 2020/0032856 A1 Jan. 30, 2020

(30) Foreign Application Priority Data

Jul. 27, 2018 (JP) .............................. JP2018-141270

(51) Int. Cl.
*F16H 57/02* (2012.01)
*F16D 13/56* (2006.01)
(Continued)

(52) U.S. Cl.
CPC ............ *F16D 13/56* (2013.01); *F16D 13/71* (2013.01); *F16D 2013/565* (2013.01); *F16H 2057/0062* (2013.01); *F16H 2057/0235* (2013.01)

(58) Field of Classification Search
CPC ................. F16H 57/027; F16H 57/031; F16H 57/02065; F16H 2057/0235;
(Continued)

(56) References Cited

U.S. PATENT DOCUMENTS 5,960,761 A * 10/1999 Kawakubo ............. F02B 61/02
123/192.2
6,962,096 B2 * 11/2005 Hojyo ..................... F02B 61/02
123/195 C
(Continued)

FOREIGN PATENT DOCUMENTS

| JP | 59-022960 | 2/1984 |
| JP | 2005-308001 | 11/2005 |

(Continued)

OTHER PUBLICATIONS

Japanese Office Action for Japanese Patent Application No. 2018-141270 dated May 19, 2020.

*Primary Examiner* — Charles A Fox
*Assistant Examiner* — Ryan P Dodd
(74) *Attorney, Agent, or Firm* — Amin, Turocy & Watson, LLP

(57) ABSTRACT

A power unit includes: a crankcase which accommodates a crankshaft and a main shaft arranged in parallel to each other; a crank side cover which covers one end portion of the crankshaft from the outside in an axial direction of the crankshaft; a primary driven gear which is provided in the main shaft and meshes with a primary drive gear of the crankshaft; a clutch provided at one end portion of the main shaft; and a clutch cover which covers the clutch from the outside in an axial direction of the main shaft and is fastened and fixed to a packing surface provided on the crankcase to surround the clutch, wherein the primary driven gear and the packing surface overlap in a virtual straight line when viewed from the axial direction of the main shaft.

4 Claims, 7 Drawing Sheets

(51) Int. Cl.
*F16D 13/71* (2006.01)
*F16H 57/00* (2012.01)
*F16H 57/023* (2012.01)

(58) Field of Classification Search
CPC ..... F16H 2057/0062; F16H 2057/0068; F16H 2057/02086; F16H 2057/0203; F16H 2057/02065; F16H 63/18; F16H 2063/3036; F16D 2300/26; F16D 2500/1117; F16D 25/068; F16D 13/71; F16D 13/56; F16D 2013/565
See application file for complete search history.

(56) References Cited

U.S. PATENT DOCUMENTS

| | | | | |
|---|---|---|---|---|
| 7,845,246 | B2* | 12/2010 | Tsukada | F16H 3/006 |
| | | | | 74/330 |
| 8,490,768 | B2* | 7/2013 | Gokan | F16D 13/56 |
| | | | | 192/70.23 |
| 8,662,233 | B2* | 3/2014 | Saitoh | F16D 21/04 |
| | | | | 180/230 |
| 2007/0272196 | A1* | 11/2007 | Nishi | F16H 57/043 |
| | | | | 123/196 R |
| 2018/0087603 | A1* | 3/2018 | Kittaka | F16H 3/089 |

FOREIGN PATENT DOCUMENTS

| | | |
|---|---|---|
| JP | 2007-077877 | 3/2007 |
| JP | 4691929 | 6/2011 |

* cited by examiner

POWER UNIT

CROSS-REFERENCE TO RELATED APPLICATION

Priority is claimed on Japanese Patent Application No. 2018-141270, filed Jul. 27, 2018, the content of which is incorporated herein by reference.

BACKGROUND

Field of the Invention

The present invention relates to a power unit.

Description of Related Art

In the related art, in a power unit, a structure in which a crankcase which accommodates a crankshaft and a main shaft arranged in parallel to each other is provided and a valve operation mechanism cover which covers a sprocket for a cam chain (valve operation mechanism member) from the outside in an axial direction of the crankshaft and a clutch cover which covers a clutch from the outside in an axial direction of a main shaft are separately provided is known (for example, Japanese Patent No. 4691929).

SUMMARY

However, if the valve operation mechanism cover and the clutch cover are separately provided, a packing surface for fastening the covers to the crankcase is required. For this reason, an inter-axis distance between the crankshaft and the main shaft increases and thus the size of a power unit is likely to be increased.

The present invention is for the purpose of achieving a decrease in the size of a power unit which includes a separate cover in the power unit.

A power unit according to the present invention employs the following configuration.

(1) A power unit according to the present invention includes: a crankcase which accommodates a crankshaft and a main shaft arranged in parallel to each other; a crank side cover which covers one end portion of the crankshaft from the outside in an axial direction of the crankshaft; a primary driven gear which is provided in the main shaft and meshes with a primary drive gear of the crankshaft; a clutch provided at one end portion of the main shaft; and a clutch cover which covers the clutch from the outside in an axial direction of the main shaft and is fastened and fixed to a packing surface provided on the crankcase to surround the clutch, wherein the primary driven gear and the packing surface overlap in a region that a virtual straight line obtained by connecting at least a center of the crankshaft to a center of the main shaft crosses when viewed from the axial direction of the main shaft.

(2) In the above mentioned aspect of (1), a valve operation mechanism member provided on the crankshaft is further provided, a wall body which protrudes further outward in the axial direction of the crankshaft than the packing surface and surrounds the valve operation mechanism member is provided on the crankcase, and a relief portion which relieves the clutch cover is formed in a portion of the wall body adjacent to the clutch cover.

(3) In the above mentioned aspect of (2), the clutch cover and the wall body overlap in the region that the virtual straight line crosses when viewed from the axial direction of the crankshaft.

(4) In the aspect of any one of above mentioned (1) to (3), intervening members which are disposed between the main shaft and the primary driven gear and provided in the main shaft in an attachable and detachable manner are further included and a thickness of the intervening members is larger than an amount of overlapping between the primary driven gear and the packing surface in the region that the virtual straight line crosses.

(5) In the above mentioned aspect of (4), concave portions are formed in surfaces of the intervening members facing outward in the axial direction of the main shaft.

According to the above mentioned aspect of (1), since the primary driven gear and the packing surface overlap in the region that the virtual straight line obtained by connecting at least the center of the crankshaft to the center of the main shaft crosses when viewed from the axial direction of the main shaft, it is possible to reduce an inter-axis distance between the crankshaft and the main shaft as compared with the structure in which the primary driven gear and the packing surface are separated from each other (the structure in which the outer form of the primary driven gear is further inward than the packing surface). Therefore, it is possible to reduce the size of the power unit.

According to the above mentioned aspect of (2), since the valve operation mechanism member provided on the crankshaft is further provided, the wall body which protrudes further outward in the axial direction of the crankshaft than the packing surface and surrounds the valve operation mechanism member is provided on the crankcase, and the relief portion which relieves the clutch cover is formed in the portion of the wall body adjacent to the clutch cover, the following effect can be achieved. The clutch cover can be brought close to the crankshaft at the relief portion, which contributes to a decrease in size of the power unit.

According to the above mentioned aspect of (3), since the clutch cover and the wall body overlap in the region in that virtual straight line crosses when viewed from the axial direction of the crankshaft, the following effect can be achieved. The clutch cover can be brought closer to the crankshaft, which contributes to a further decrease in size of the power unit.

According to the above mentioned aspect of (4), since the intervening member which is disposed between the main shaft and the primary driven gear and provided in the main shaft in an attachable and detachable manner is further provided and the thickness of the intervening member is larger than the amount of overlapping between the primary driven gear and the packing surface in the region that the virtual straight line crosses, the following effect can be achieved. Since the intervening member is first removed when the primary driven gear is removed from the main shaft, a gap larger than the amount of overlapping between the primary driven gear and the packing surface is generated between the main shaft and the primary driven gear. Therefore, the primary driven gear can be removed without interfering with the crankcase.

According to the above mentioned aspect of (5), since the concave portion is formed in the surface of the intervening member outward in the axial direction of the main shaft, the following effect can be achieved. The intervening member can be easily taken out using the concave portion of the intervening member. For example, since the concave portion for a tool is provided in the intervening member, the intervening member can be easily taken out using the tool.

DETAILED DESCRIPTION

Figure 1:
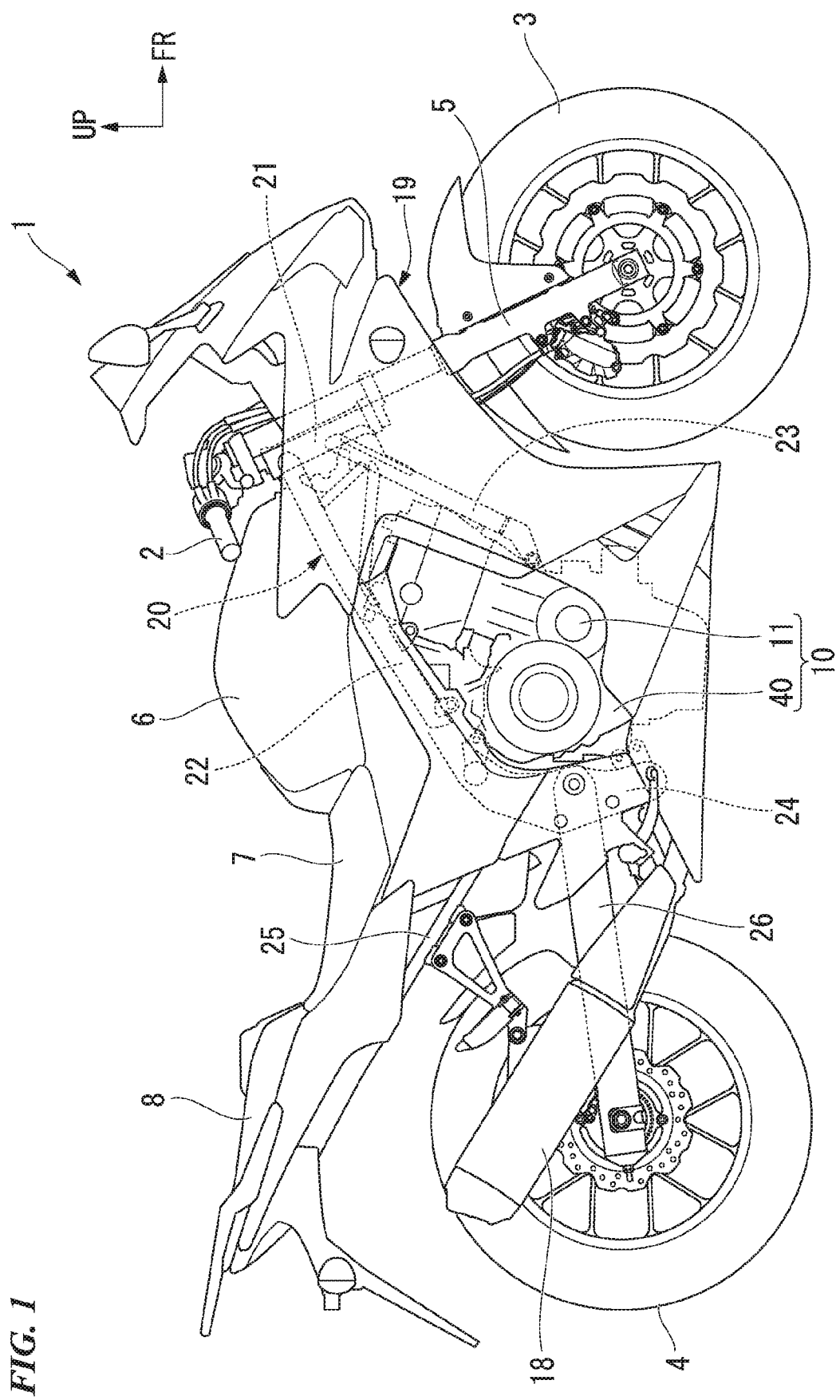
FIG. 1 is a right side view of a motorcycle according to an embodiment.

An embodiment of the present invention will be described below with reference to the drawings. Note that directions such as forward, rearward, leftward, and rightward in the following description are the same directions in a vehicle which will be described later unless specifically stated otherwise. Furthermore, an arrow FR indicating a forward direction of a vehicle, an arrow LH indicating a leftward direction of the vehicle, and an arrow UP indicating an upper direction of the vehicle are shown at appropriate positions in the drawings used in the following description.

<Whole Vehicle>

FIG. 1 shows a motorcycle 1 as an example of a saddle-type vehicle. Referring to FIG. 1, the motorcycle 1 includes a front wheel 3 steered by a handlebar 2 and a rear wheel 4 driven by a power unit 10 including a power source. Hereinafter, the motorcycle is simply referred to as "a vehicle" in some cases.

Steering system components including the handlebar 2 and the front wheel 3 are supported by a head pipe 21 in a steerable manner at the front end of a vehicle body frame 20. An outer circumference of the vehicle body frame 20 is covered by a vehicle body cover 19. In FIG. 1, reference numeral 5 shows a front fork which supports the front wheel 3 pivotally.

The vehicle body frame 20 includes the head pipe 21 which supports the front fork 5 in a steerable manner, a pair of left and right main frames 22 extending rearward and downward from the head pipe 21, a pair of left and right down frames 23 extending rearward and downward from positions lower than those of the main frames 22 in the head pipe 21, a pivot frame 24 extending downward from the rear portion of the main frames 22, and a pair of left and right seat rails 25 extending rearward and upward from the upper portion of the pivot frame 24.

The handlebar 2 is fixed to the upper portion of the front fork 5. A fuel tank 6 is disposed above the main frames 22. A front seat 7 on which a driver sits is disposed above the seat rails 25 behind the fuel tank 6. A rear seat 8 on which a passenger sits is disposed behind the front seat 7.

The power unit 10 having an engine 11 and a transmission 40 integrally provided therein is suspended above the main frames 22. The power unit 10 is disposed in a region surrounded by the main frames 22, the down frames 23, and the pivot frame 24. An output shaft of the power unit 10 is connected to the rear wheel 4 via a chain (not shown) to be able to transmit power. Reference numeral 18 in the drawing indicates a muffler connected to an exhaust pipe of the power unit 10.

A front end portion of a swing arm 26 is supported by the pivot frame 24 in a swingable manner. The rear wheel 4 is rotatably supported by a rear end portion of the swing arm 26. A cushion unit (not shown) is disposed between the swing arm 26 and the pivot frame 24.

<Power Unit>

Figure 2:
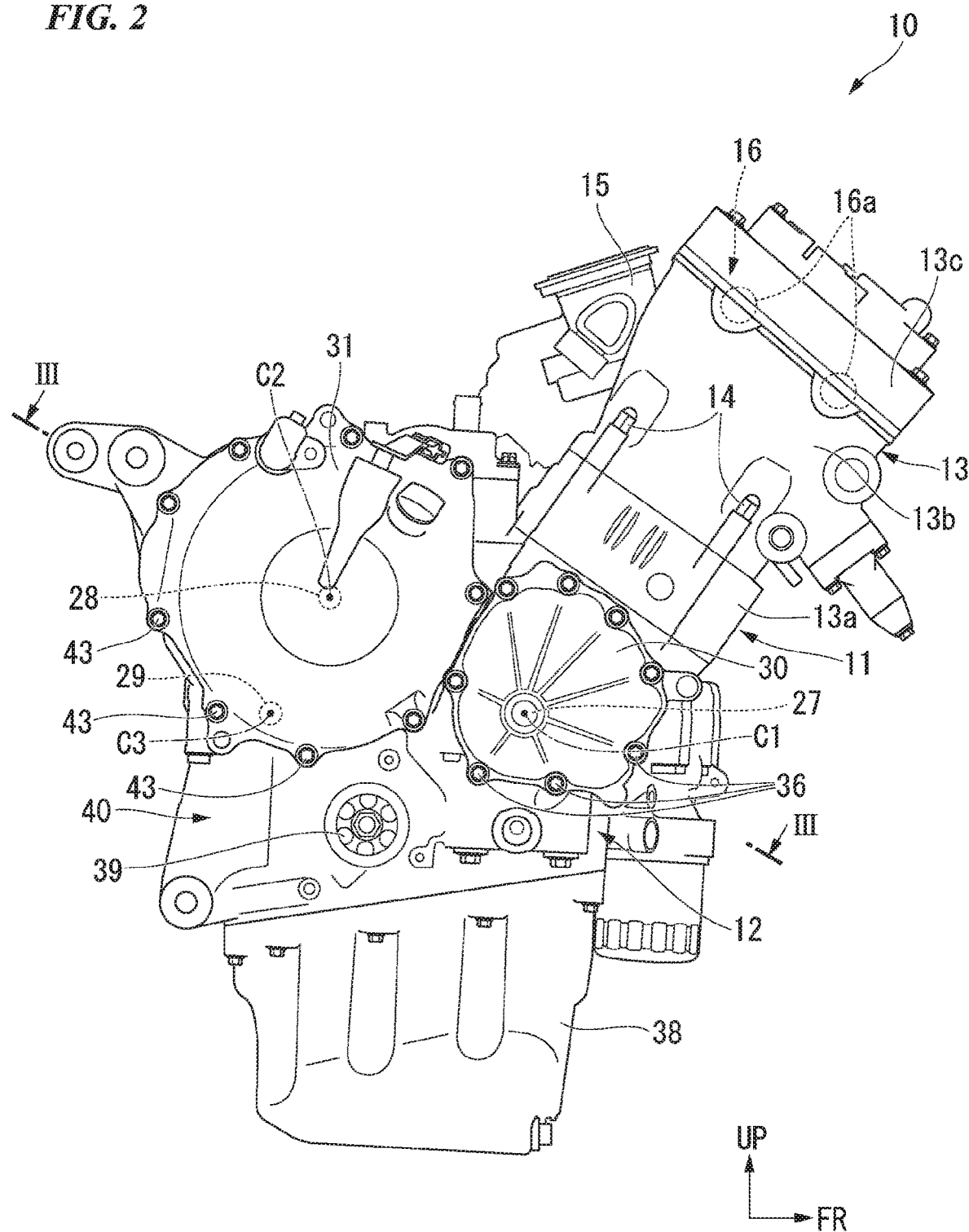
FIG. 2 is a right side view of a power unit according to the embodiment.

As shown in FIG. 2, the engine 11 in the power unit 10 includes a crankcase 12 which rotatably supports a crankshaft 27 (crankshaft) and a cylinder 13 which is erected upward obliquely from a front upper portion of the crankcase 12. The engine 11 has a structure in which the crankshaft 27 is aligned in a vehicle width direction (a leftward/rightward direction).

The crankcase 12 accommodates the crankshaft 27, a main shaft 28 (main shaft), and a countershaft 29 (countershaft) arranged in parallel to each other. In the drawing, reference numeral C1 indicates a center (rotational center) of the crankshaft 27, reference numeral C2 indicates a center (rotational center) of the main shaft 28, and reference numeral C3 indicates a center (rotational center) of the countershaft 29. Hereinafter, the central axis of the crankshaft 27 is referred to as "a crank axis," the central axis of the main shaft 28 is referred to as "a main axis," and the central axis of the countershaft 29 is referred to as "a counter axis." In the drawing, reference numeral L1 indicates the crank axis and reference numeral L2 indicates the main axis (refer to FIG. 3).

A crank side cover 30 which covers a right end portion (one end portion) of the crankshaft 27 from the right side is provided on a front right side portion of the crankcase 12. A clutch cover 31 is provided on an upper rear side of the crank side cover 30. The crank side cover 30 and the clutch cover 31 are separately provided. The crank side cover 30 and the clutch cover 31 are disposed adjacent to each other. In the drawing, reference numeral 38 indicates an oil pan configured to store lubricating oil and reference numeral 39 indicates an oil pump configured to draw up oil in the oil pan 38 and to pump the oil to a portion requiring lubrication in the power unit 10.

The cylinder 13 includes a cylinder block 13a integrally provided with the crankcase 12, a cylinder head 13b attached to the upper portion of the cylinder block 13a, and a head cover 13c attached to the upper portion of the cylinder head 13b. The cylinder head 13b and the upper portion of the cylinder block 13a overlap and the cylinder head 13b is fastened and fixed to an upper surface of the crankcase 12 using a plurality of bolts 14 together with the cylinder block 13a.

A piston (not shown) is fitted into the cylinder block 13a. The reciprocating movement of the piston is converted into rotational drive of the crankshaft 27 via a connecting rod (not shown). For example, a rotational driving force of the crankshaft 27 is input to the rear transmission 40 from a primary drive gear 37 provided in the crankshaft 27 (refer to FIG. 3). The driving force input to the transmission 40 is transmitted from the rear portion of the crankcase 12 to the rear wheel 4 (refer to FIG. 1) via a chain drive type power transmission mechanism (not shown).

The engine 11 has a structure in which a transmission portion is integrally provided. The rear portion of the crankcase 12 in the engine 11 constitutes a transmission case accommodating the transmission 40 and a change mechanism (not shown) configured to shift a stage of the transmission 40. That is to say, the cylinder block 13a and the transmission case are integrated in the crankcase 12.

An intake port and an exhaust port (which are not shown) are formed in the cylinder head 13b. An intake valve by which the intake port is opened and closed and an exhaust valve by which the exhaust port is opened and closed are attached to the cylinder head 13b. An inlet pipe 15 which constitutes an intake system of the engine 11 is connected to the intake port. An exhaust pipe (not shown) which constitutes an exhaust system of the engine 11 is connected to the exhaust port.

A valve operation mechanism 16 configured to open and close the intake valve and the exhaust valve is provided between the cylinder head 13b and the head cover 13c. In the drawing, reference numeral 16a indicates a cam shaft configured to operate a valve operation cam of the valve operation mechanism 16. The cam shaft 16a is connected to the crankshaft 27 in an interlockable manner via a timing chain and a gear. In the embodiment, a method in which the chain and the gear are used together, i.e., a so-called semi-cam gear train, is adopted for transmission of power with which the valve operation cam is rotated.

Figure 3:
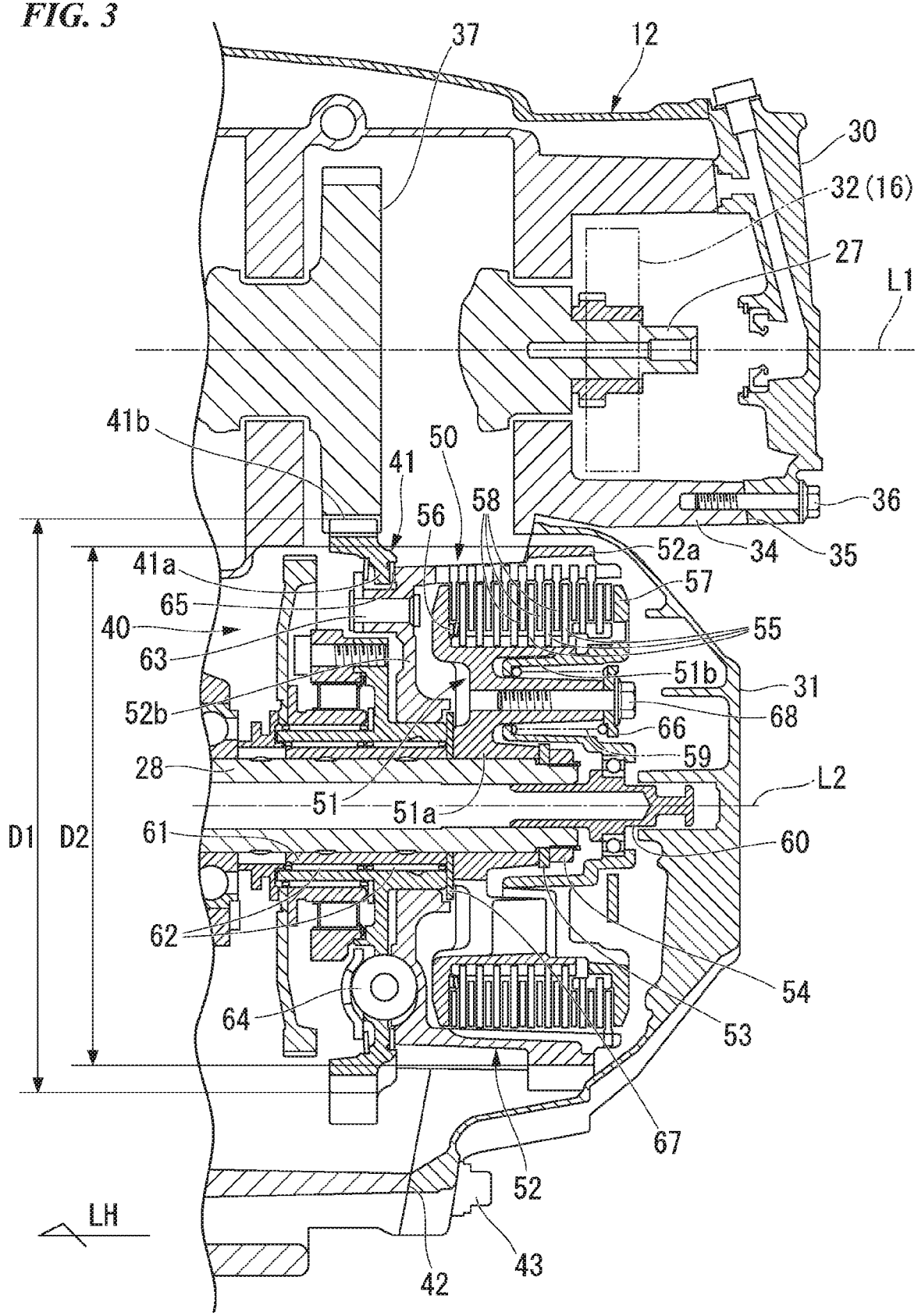
FIG. 3 is a cross-sectional view taken along line of FIG. 2.
Figure 5:
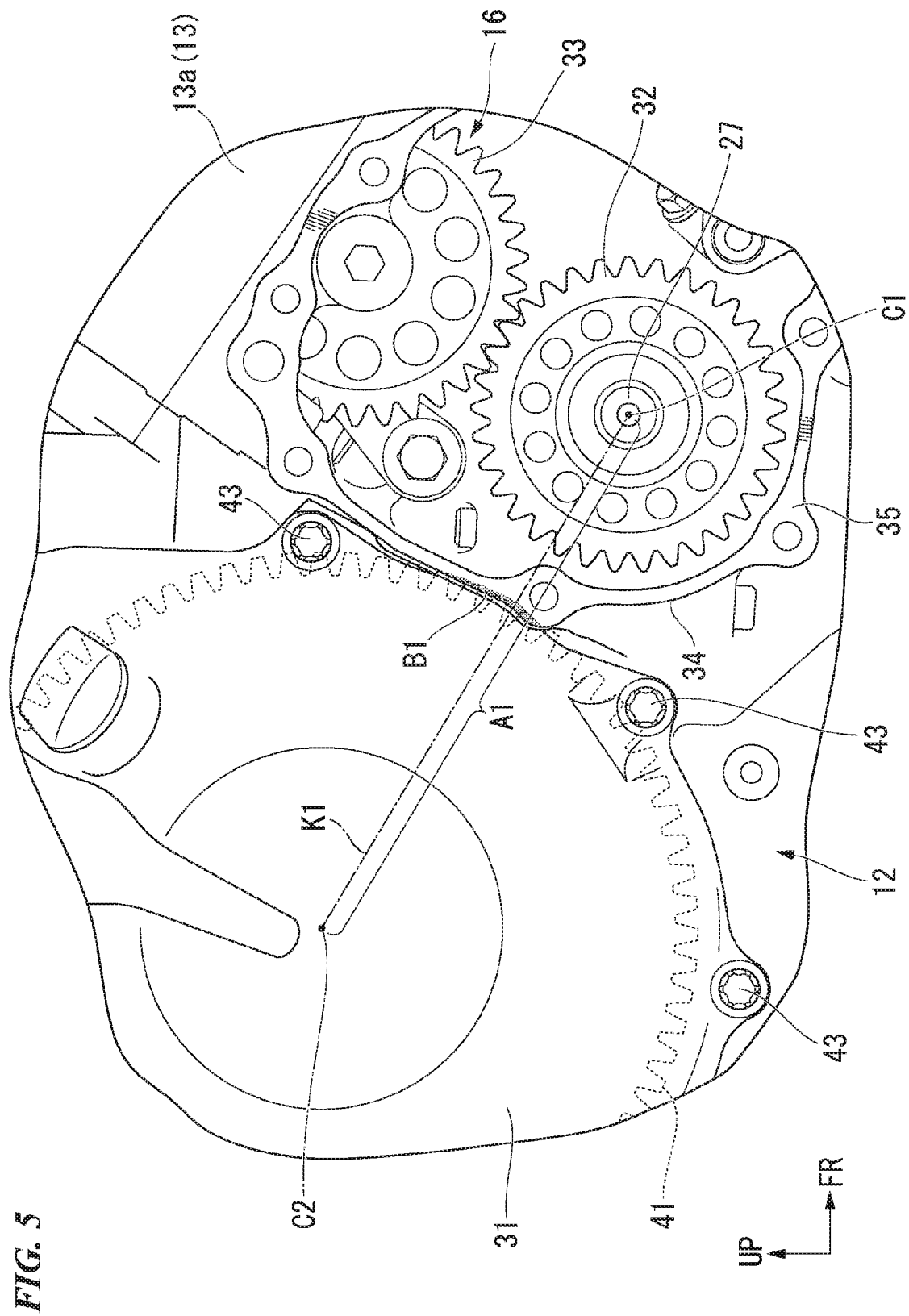
FIG. 5 is a right side view showing an overlapping portion between a clutch cover and the wall body according to the embodiment.

As shown in FIG. 3, a gear 32 (valve operation mechanism member) which constitutes the valve operation mechanism 16 is attached to the right end portion (one end portion) of the crankshaft 27 (refer to FIG. 5). The crank side cover 30 functions as a valve operation mechanism cover which covers the gear 32 (hereinafter also referred to as "a first valve operation gear 32") constituting the valve operation mechanism 16 from the outside in a crankshaft direction (the outside in an axial direction of the crankshaft). In the drawing, reference numeral 33 indicates a second valve operation gear which meshes with the first valve operation gear 32 and constitutes the valve operation mechanism 16 (refer to FIG. 5).

A wall body 34 which surrounds the first valve operation gear 32 is provided on a right side portion of the crankcase 12. A right side surface of the wall body 34 forms a packing surface 35 (hereinafter also referred to as "a crank side packing surface 35") having the crank side cover 30 attached thereto via a packing (seal). The crank side cover 30 is fastened and fixed to the crank side packing surface 35 using a plurality of (for example, eight) bolts 36 (refer to FIG. 2).

The primary drive gear 37 configured to transmit power to the main shaft 28 of the transmission 40 is attached to the crankshaft 27. The primary drive gear 37 is disposed inward in the crankshaft direction of the first valve operation gear 32.

Although not shown in the drawing, a generator (for example, an alternating current generator: ACG) is attached to a left end portion of the crankshaft 27 (the other end portion opposite to the first valve operation gear 32).

A primary driven gear 41 which meshes with the primary drive gear 37 of the crankshaft 27 and a clutch 50 by which power is connected and disconnected through an external operation are supported by a right end portion (one end portion) of the main shaft 28 in the transmission 40.

The primary driven gear 41 is rotatably supported by the main shaft 28.

The clutch 50 is disposed in a power transmission path between the primary driven gear 41 and the main shaft 28. The clutch 50 can switch transmission and disconnection of power between the primary driven gear 41 and the main shaft 28 through an external operation.

The clutch cover 31 covers the clutch 50 from the outside in a main shaft direction (the outside in the axial direction of the main shaft). A packing surface 42 (hereinafter also referred to as "a clutch side packing surface 42") surrounding the clutch 50 is formed on a right side portion of the crankcase 12. The clutch cover 31 is attached to the clutch side packing surface 42 via the packing (seal). The clutch cover 31 is fastened and fixed to the clutch side packing surface 42 using a plurality of (for example, nine) bolts 43 (refer to FIG. 2).

In the cross-sectional view of FIG. 3, the clutch side packing surface 42 has a linear shape that obliquely intersects a forward/rearward direction. The clutch side packing surface 42 extends substantially in the forward/rearward direction to be inclined so that a front end of the clutch side packing surface 42 is located on a right side and a rear end of the clutch side packing surface 42 is located on a left side. The front end of the clutch side packing surface 42 is located near a base end of the wall body 34.

The clutch 50 includes a clutch center 51 and a clutch outer 52 which are coaxially disposed on the main shaft 28.

The clutch center 51 includes a central cylindrical portion 51a which is disposed on an inner side in a radial direction and is spline-engaged with the main shaft 28. The central cylindrical portion 51a is fixed to the right end portion of the main shaft 28 using a lock nut 54 via a washer 53.

The clutch center 51 includes a cylindrical disc support portion 51b disposed on an outer side in the radial direction. A plurality of clutch disks 55 are supported by an outer circumference of the disc support portion 51b. A stopper portion 56 is integrally formed with a left end portion of the disc support portion 51b. A pressure plate 57 is disposed on the right side of the disc support portion 51b with a space therebetween.

The clutch outer 52 has a bottomed cylindrical shape in which the clutch outer 52 accommodates the clutch center 51. A plurality of clutch plates 58 are supported by an inner circumference of an outer wall portion 52a in the clutch outer 52.

Each of the clutch plates 58 and each of the clutch disks 55 are alternately arranged between the stopper portion 56 and the pressure plate 57 in a main axial direction. A spring 59 is disposed outside the central cylindrical portion 51a in a radial direction thereof. The spring 59 is disposed between the pressure plate 57 and a support plate 66. The spring 59 elastically biases the pressure plate 57 leftward and each of clutch plates 58 and each of clutch disks 55 are frictionally engaged with each other.

When the pressure plate 57 is pulled away from the clutch center 51 against a biasing force of the spring 59, the clutch 50 enters a clutch disconnection state. On the other hand, when a resisting force of the pressure plate 57 is released, the clutch 50 enters a clutch connection state due to a biasing force of the spring 59.

The main shaft 28 is formed in a hollow shape. A lifter pin 60 is inserted into the main shaft 28. The switching of connection and disconnection of the clutch 50 is performed in accordance with the advancement and retreatment movement of the lifter pin 60 with respect to the main shaft 28.

The primary driven gear 41 is disposed adjacent to a bottom portion of the clutch outer 52 in the main axial direction. A tooth portion 41b is formed in an outer circumference of the main body portion 41a in the primary driven gear 41.

A diameter D1 of the primary driven gear 41 is larger than a diameter D2 of the clutch outer 52 (D1>D2).

Here, the diameter D1 of the primary driven gear 41 refers to a diameter of a virtual circle (tooth tip circle) formed by connecting the tips of the teeth of the tooth portion 41b using a main axis L2 as a center. The diameter D2 of the clutch outer 52 is the diameter of the outermost circumferential edge of the outer wall portion 52a of the clutch outer 52 using the main axis L2 as a center.

An annular collar 61 or the like centered on the main axis L2 is provided on the main shaft 28. The main body portion 41a of the primary driven gear 41 is relatively rotatably supported by the main shaft 28 via the collar 61 and a needle bearing 62. A bottom portion 52b of the clutch outer 52 is connected to the primary driven gear 41 via a rivet 63. The clutch outer 52 rotates integrally with the crankshaft 27 along with the rotation of the crankshaft 27. Reference numeral 67 in the drawing indicates a washer provided between the central cylindrical portion 51a of the clutch center 51 and the collar 61 and reference numeral 68 in the drawing indicates bolts for fixing the support plate 66.

In the drawing, reference numeral 64 indicates a coil spring (first damper) which is disposed between the primary driven gear 41 and the bottom portion 52b of the clutch outer 52 in a rotational direction of the primary driven gear 41 and can absorb impacts and the like generated in a rotational direction of the main shaft 28 and reference numeral 65 indicates a disc spring (second damper) which is disposed between the primary driven gear 41 and the bottom portion 52b of the clutch outer 52 in the main axial direction and can absorb impacts and the like generated in the main axial direction.

Although not shown in the drawing, a main gear group and a counter gear group having a plurality of transmission gears are provided between the main shaft 28 of the transmission 40 and the countershaft 29 (refer to FIG. 2). In the transmission 40, transmission gears of the main gear group and the counter gear group are selected by the operation of a change mechanism (not shown). With this, any of the transmission gear stages (gear positions), including a neutral stage, is set. When the rotational power of the crankshaft 27 is transmitted to the main shaft 28 via the clutch 50 in a state in which a transmission gear stage is set, the transmission 40 shifts its rotational power to a set ratio and outputs the shifted set ratio from the countershaft 29 (refer to FIG. 2) to the outside thereof.

<Positional Relationship Between Primary Driven Gear and Packing Surface>

Figure 7:
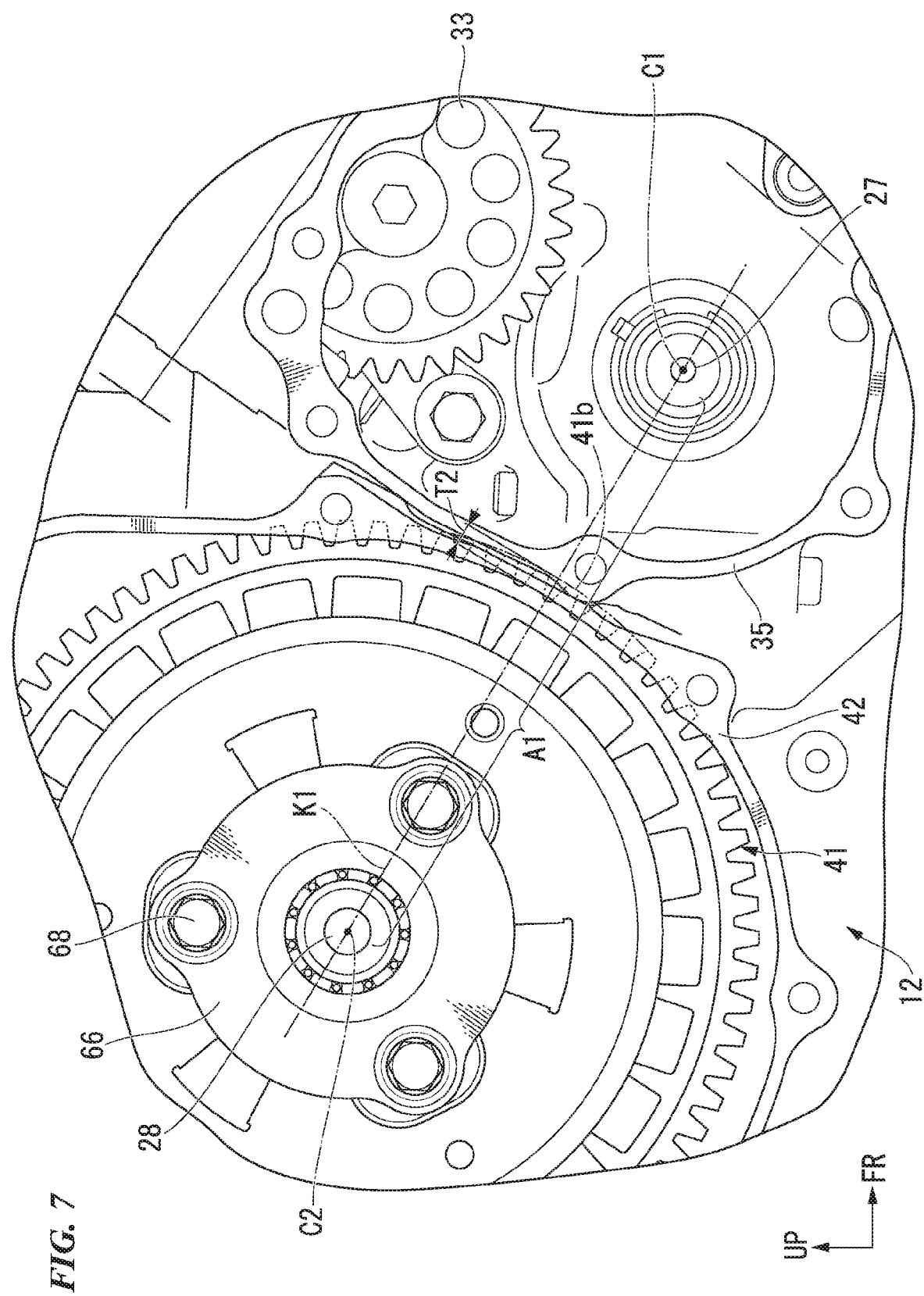
FIG. 7 is a right side view showing an amount of overlapping between a primary driven gear and a packing surface according to the embodiment.

The primary driven gear 41 and the packing surfaces 35 and 42 overlap in a region A1 (hereinafter referred to as "a virtual straight crossing region A1") along which a virtual straight line K1 obtained by connecting at least a center C1 of the crankshaft 27 to a center C2 of the main shaft 28 crosses when viewed from the main shaft direction of FIG. 7. The primary driven gear 41, the clutch side packing surface 42, and the crank side packing surface 35 overlap in the virtual straight crossing region A1 when viewed from the main shaft direction. The tooth portion 41b (tooth tip circle) of the primary driven gear 41 and the crank side packing surface 35 overlap in the virtual straight crossing region A1 when viewed from the main shaft direction.

<Positional Relationship Between Wall Body and Clutch Cover>

Figure 4:
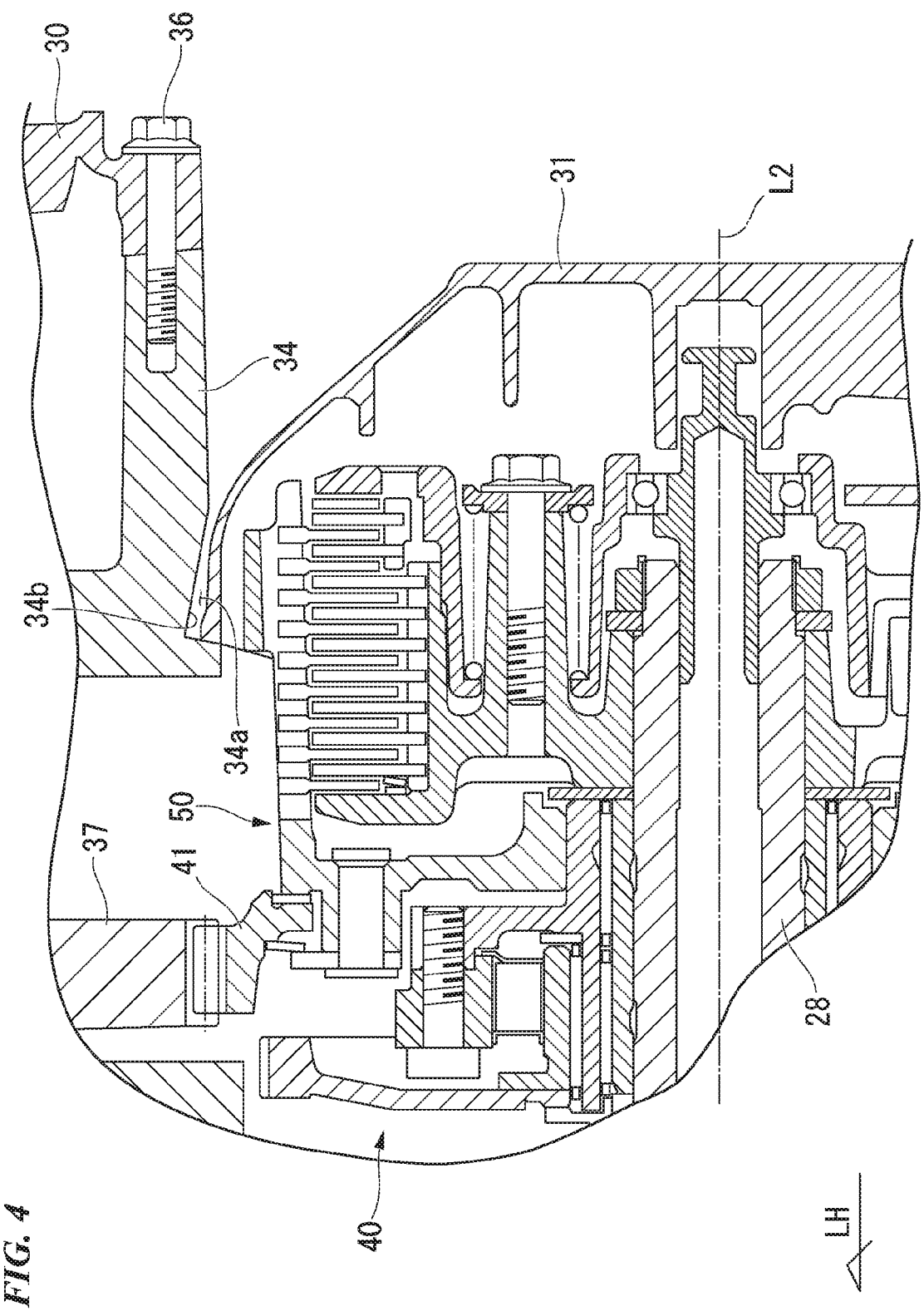
FIG. 4 is an enlarged view of a main part of FIG. 3 showing a relief portion of a wall body according to the embodiment.

As shown in FIG. 3, the wall body 34 protrudes further outward in the crankshaft direction than the clutch side packing surface 42 and surrounds the first valve operation gear 32. As shown in FIG. 4, a relief portion 34a configured to relieve the clutch cover 31 is formed in a portion of the wall body 34 adjacent to the clutch cover 31. The relief portion 34a is formed at a portion at which a base portion of the wall body 34 and a front portion of the clutch cover 31 are close to each other. A relief portion formation surface 34b (base portion rear surface) of the wall body 34 extends obliquely with respect to the main axis L2. The relief portion formation surface 34b extends in substantially the main shaft direction (substantially the vehicle width direction) obliquely so that a left end of the relief portion formation surface 34b is located on the front side and a right end of the relief portion formation surface 34b is located on the rear side.

The clutch cover 31 and the wall body 34 overlap in the virtual straight crossing region A1 when viewed from the crankshaft direction of FIG. 5. In the cross-sectional view of FIG. 4, when a front end of the clutch cover 31 enters the relief portion 34a, a part of the clutch cover 31 and a part of the wall body 34 overlap when viewed from the crankshaft direction. The clutch cover 31 is closest to the wall body 34 at upper and lower central positions of two bolts 43 when viewed from the crankshaft direction of FIG. 5. Reference numeral B1 in the drawing indicates an overlapping portion between the clutch cover 31 and the wall body 34.

<Intervening Member>

Figure 6:
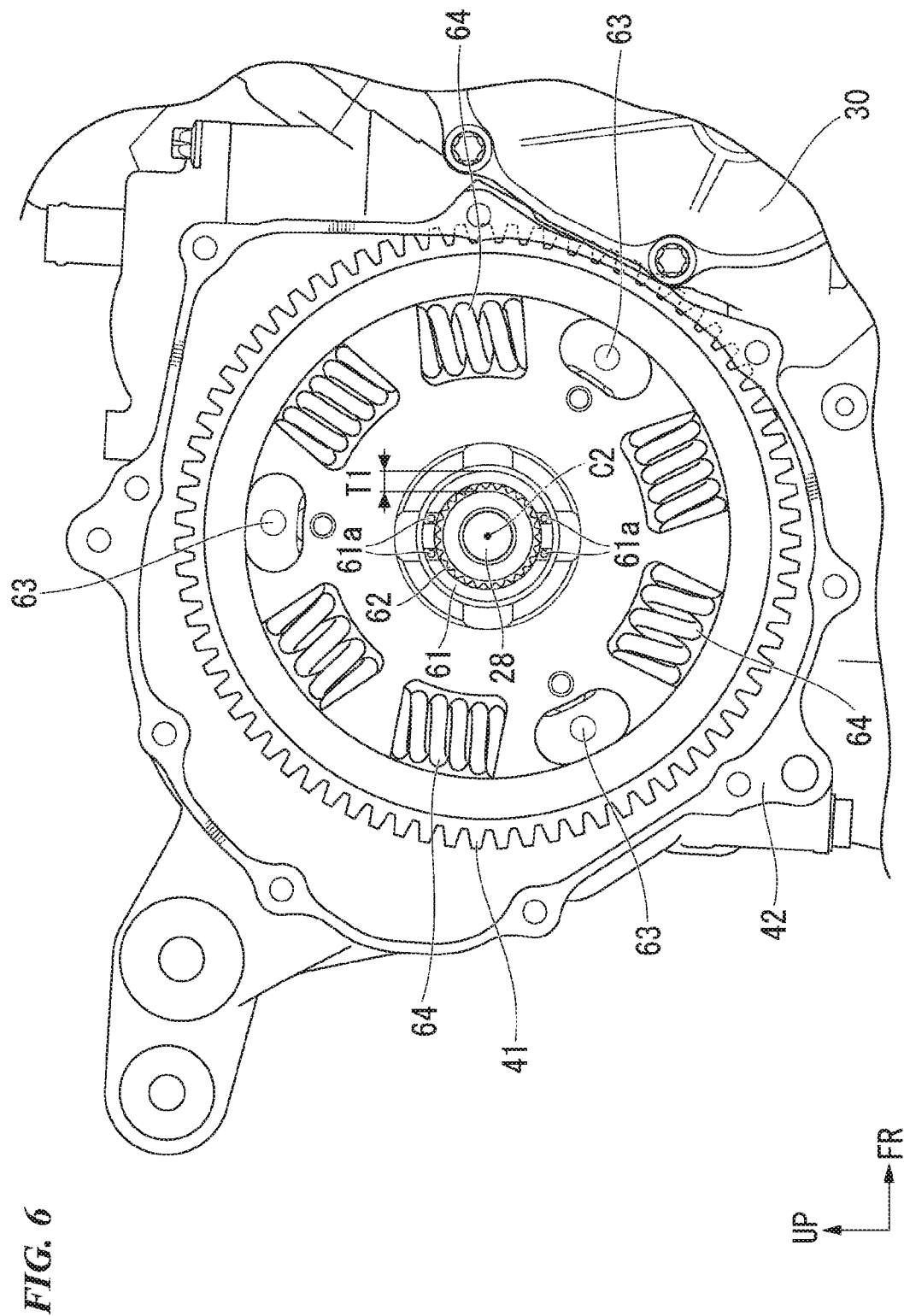
FIG. 6 is a right side view showing an intervening member according to the embodiment.

As shown in FIG. 3, the intervening members 61 and 62 (the collar 61 and the needle bearing 62) are disposed between the main shaft 28 and the primary driven gear 41. The intervening members 61 and 62 are provided in the main shaft 28 in an attachable and detachable manner. As shown in FIG. 6, concave portions 61a are formed in a surface of the collar 61 facing outward in the main shaft direction. For example, the concave portions 61a are tool grooves. The pair of concave portions 61a are provided to across the main shaft 28. The pair of concave portions 61a are provided at intervals in a circumferential direction of the collar 61.

A thickness T1 of the intervening members 61 and 62 is larger than an amount of overlapping T2 (refer to FIG. 7) between the primary driven gear 41 and the packing surfaces 35 and 42 in the virtual straight crossing region A1 (T1>T2). Here, the thickness T1 of the intervening members 61 and 62 refers to a length of the intervening members 61 and 62 in a radial direction of the main shaft 28 (a distance between an inner circumferential surface of the collar 61 and an outer circumferential surface of the needle bearing 62). The amount of overlapping T2 refers to a distance between a tooth tip circle of the primary driven gear 41 above the virtual straight line K1 and an inner circumferential end of the clutch side packing surface 42 (refer to FIG. 7).

As described above, in the above-described embodiment, the crankcase 12 which accommodates the crankshaft 27 and the main shaft 28 arranged in parallel to each other, the crank side cover 30 which covers one end portion of the crankshaft 27 from the outside in the crankshaft direction, the primary driven gear 41 which is provided in the main shaft 28 and meshes with the primary drive gear 37 of the crankshaft 27, the clutch 50 which is provided at one end portion of the main shaft 28, and the clutch cover 31 which covers the clutch 50 from the outside in the main shaft direction and is fastened and fixed to the clutch side packing surface 42 provided on the crankcase 12 to surround the clutch 50 are provided. In addition, at least the primary driven gear 41 and the crank side packing surface 35 overlap in the virtual straight crossing region A1 when viewed from the main shaft direction.

With such a constitution, since at least the primary driven gear 41 and the crank side packing surface 35 overlap in the virtual straight crossing region A1 when viewed from the main shaft direction, it is possible to reduce an inter-axis distance between the crankshaft 27 and the main shaft 28 as compared with a structure in which the primary driven gear 41 and the crank side packing surface 35 are separated from each other (a structure in which an outer form of the primary driven gear 41 is further inward than the clutch side packing surface 42). Therefore, it is possible to reduce the size of the power unit 10.

In the above-described embodiment, since the first valve operation gear 32 provided in the crankshaft 27 is further provided, the wall body 34 which protrudes further outward in the crankshaft direction than the clutch side packing surface 42 and surrounds the first valve operation gear 32 is provided on the crankcase 12, and the relief portion 34a configured to relieve the clutch cover 31 is formed in a portion of the wall body 34 adjacent to the clutch cover 31, the following effects can be achieved. Since the clutch cover 31 can be brought close to the crankshaft 27 in the relief portion 34a, which contributes to a decrease in size of the power unit 10.

In the above-described embodiment, since the clutch cover 31 and the wall body 34 overlap in the virtual straight crossing region A1 when viewed from the crankshaft direction, the following effects can be achieved. Since the clutch cover 31 can be brought closer to the crankshaft 27, this contributes to a further decrease in size of the power unit 10.

In the above-described embodiment, since the intervening members 61 and 62 which are disposed between the main shaft 28 and the primary driven gear 41 and provided in the main shaft 28 in an attachable and detachable manner are further provided and the thickness T1 of the intervening members 61 and 62 is larger than the amount of overlapping T2 between the primary driven gear 41 and the packing surfaces 35 and 42 in the virtual straight crossing region A1, the following effects can be achieved. Since the intervening members 61 and 62 are first removed when the primary driven gear 41 is removed from the main shaft 28, a gap larger than the amount of overlapping between the primary driven gear 41 and the packing surfaces 35 and 42 is generated between the main shaft 28 and the primary driven gear 41. Therefore, the primary driven gear 41 can be removed without interfering with the crankcase 12.

In the above-described embodiment, since the concave portions 61a are formed on the surface of the collar 61 facing outward in the main shaft direction, the following effects can be achieved. The intervening members (the collar 61 and the needle bearing 62) can be easily removed using the concave portions 61a of the collar 61. For example, since the concave portions 61a for a tool are provided in the collar 61, the intervening members 61 and 62 can be easily removed using the tool.

Modified Example

A case in which the primary driven gear 41, the clutch side packing surface 42, and the crank side packing surface 35 overlap in the virtual straight crossing region A1 when viewed from the main shaft direction has been described by way of example in the above-described embodiment, the present invention is not limited thereto. For example, the primary driven gear 41 and only the clutch side packing surface 42 may overlap in the virtual straight crossing region A1 when viewed from the main shaft direction.

Although a case in which the crank side cover 30 functions as the valve operation mechanism cover which covers the gear 32 (valve operation mechanism member) constituting the valve operation mechanism 16 from the outside in the crankshaft direction has been described in the above embodiment, the present invention is not limited thereto. For example, the crank side cover 30 may be a cover which covers members such as a sensor and a pump other than the valve operation mechanism member from the outside in the crankshaft direction. That is to say, the crank side cover 30 may cover one end portion of the crankshaft 27 from the outside in the crankshaft direction.

Note that the present invention is not limited to the above-described embodiment. In addition, for example, the saddle-type vehicle includes all vehicles on which a driver sits above a vehicle body and includes not only motorcycles (including motorbikes and scooter type vehicles) but also three-wheeled vehicles (including two-front-wheeled and one-rear-wheeled vehicles as well as one-front-wheeled and two-rear-wheeled vehicles). Furthermore, the present invention can be applied not only to motorcycles but also to four-wheeled vehicles such as automobiles.

Also, the constitution of the above-described embodiment is an example of the present invention and various changes can be provided without departing from the gist of the present invention such as replacing the constituent elements of the embodiment with known constituent elements.

What is claimed is:

1. A power unit comprising:
a crankcase which accommodates a crankshaft and a main shaft arranged in parallel to each other;
a crank side cover which covers one end portion of the crankshaft from the outside in an axial direction of the crankshaft;
a primary driven gear which is provided in the main shaft and meshes with a primary drive gear of the crankshaft;
a clutch provided at one end portion of the main shaft; and
a clutch cover which covers the clutch from the outside in an axial direction of the main shaft and is fastened and fixed to a packing surface provided on the crankcase to surround the clutch,
wherein the primary driven gear and the packing surface overlap on a virtual straight line obtained by connecting a center of the crankshaft to a center of the main shaft when viewed from the axial direction of the main shaft, further comprising:
a valve operation mechanism member provided on the crankshaft,
wherein a wall body which protrudes further outward in the axial direction of the crankshaft than the packing surface and surrounds the valve operation mechanism member is provided on the crankcase, and
a relief portion which relieves the clutch cover is formed in a portion of the wall body adjacent to the clutch cover, wherein
a relief portion formation surface of the wall body extends obliquely with respect to a central axis of the main shaft.

2. The power unit according to claim 1, wherein the clutch cover and the wall body overlap on the virtual straight line when viewed from the axial direction of the crankshaft.

3. The power unit according to claim 1, further comprising:
intervening members which are disposed between the main shaft and the primary driven gear and provided on the main shaft in an attachable and detachable manner,
wherein a thickness of the intervening members is larger than an amount of overlapping between the primary driven gear and the packing surface on the virtual straight line.

4. The power unit according to claim 3, wherein concave portions are formed in surfaces of the intervening members facing outward in the axial direction of the main shaft.

* * * * *